Aug. 22, 1967     B. L. SNAVELY     3,336,801
APPARATUS FOR MEASURING WATER FLOW VELOCITY
Filed Sept. 21, 1964     7 Sheets-Sheet 1

INVENTOR
Benjamin L. Snavely

BY

ATTORNEY

FIG. 4

INVENTOR
Benjamin L. Snavely
BY
ATTORNEY

Aug. 22, 1967     B. L. SNAVELY     3,336,801
APPARATUS FOR MEASURING WATER FLOW VELOCITY
Filed Sept. 21, 1964     7 Sheets-Sheet 6

FIG. 8

INVENTOR
Benjamin L. Snavely

BY

ATTORNEY 3,336,801
APPARATUS FOR MEASURING WATER FLOW VELOCITY
Benjamin L. Snavely, Silver Spring, Md., assignor to the United States of America as represented by the Secretary of the Navy
Filed Sept. 21, 1964, Ser. No. 398,130
9 Claims. (Cl. 73—189)

The invention described herein may be manufactured and used by or for the Government of the United States of America for governmental purposes without the payment of any royalties thereon or therefor.

The present invention is directed to an improved means for measuring water flow velocities and more particularly to a novel electronic system for accurately measuring water velocities about the hull of a ship.

Prior art systems for measuring water flow velocities include mechanical transducers such as propellers or screws, paddlewheels, deflecting vanes, and Pitot tubes. These instruments may have their accuracy seriously impaired by marine growths. Furthermore, the outputs of these mechanical systems are normally a complicated function of several components of the flow velocity.

Much more accurate results have been obtained using an acoustic flow velocity meter in which the flow velocity is determined from the difference in speeds of propagation of two acoustic waves travelling in opposite directions along the line which the flow velocity is to be determined. One type of acoustic flow velocity meter employs an amplitude modulated continuous acoustic wave emanating from a single source and travelling in opposite directions at different carrier frequencies. By using two transducers to emit and receive the two modulated carrier waves, the time difference in travel in the two directions may be determined from the phase difference between the modulations on the received signals. This type of acoustic flow velocity measuring system can be designed to give good results but the circuitry is usually complicated and requires numerous adjustments during operation thereof. Furthermore, special attention must be given to the elimination of cross talk in the electrical circuits and to the reflection and scattering in the acoustic path which may simulate phase shifts due to motion of the medium through which the waves travel.

The present invention in its broadest sense employs a pulsed source of acoustic energy in place of a modulated continuous wave source, and the pulsed source supplies pulses simultaneously to a pair of electroacoustic transducers located respectively to the two points between which the velocity is to be measured. The pulse emitted by each transducer will eventually reach the other transducer and will be reconverted to electrical energy. While the pulses are travelling through the fluid, the electrical leads of the transducers are removed from the pulsed source and connected to a time interval counter which measures the time difference between the instances at which the leading edges of the pulses are received at the two transducers.

The invention in a more elaborate form employs receiver-limiter circuits in separate channels for passing signals from a pair of transducers in each channel to a pair of Schmitt triggers in each channel. Digital techniques are utilized to demodulate the Schmitt trigger outputs containing the transient time information representing the magnitude and direction of the water flow between each pair of transducers and to resolve the resultant quantity into fore-aft and port-starboard velocity components. This information is then converted from the digital form to the analog form in a digital-to-anolog converter.

It is an object of the present invention to provide an improved system for measuring water flow velocity.

It is another object of the invention to provide a water velocity measuring system employing the same transducers for both transmission and reception of an acoustic signal and which processes only the leading edge of signals arriving at the transducers.

A further object is to provide a system for measuring water flow velocity employing digital techniques for accurately measuring the propagation time differential between pulses transmitted simultaneously in opposite directions between separate transducers.

Other objects and advantages of the present invention will become more fully apparent from the following detailed description of the drawings.

Figure 1:
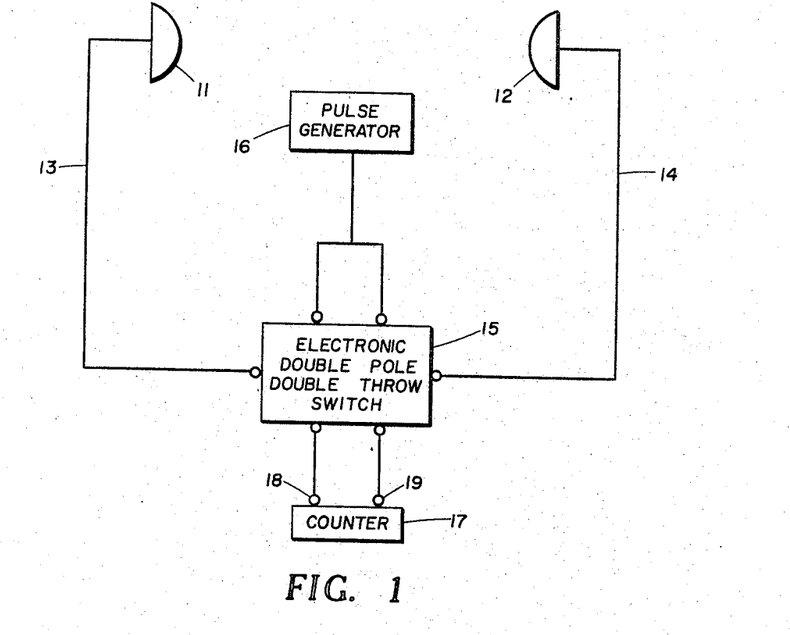
FIG. 1 illustrates the basic form of the present invention.

There is shown in FIG. 1 a pair of spatially separated transducers 11 and 12 connected by electrical leads 13 and 14 respectively to an electronic switching mechanism 15 which acts as a double pole, double throw switch. The switch 15 alternately connects the transducers 11 and 12 in parallel to the electrical pulse generator 16. Immediately after a pulse is projected from transducers 11 and 12, the switch 15 connects the transducers 11 and 12 respectively to the two inputs 18 and 19 of a time interval counter 17. The water flow velocity between the two transducers 11 and 12 is determined from the time interval between the arrival of the sharply rising fronts of two pulses, and subsequently arriving signals do not affect the time measurement. Since the interfering pulses due to the scattering and reflection all arrive after the directly transmitted pulses, it is evident that they cannot produce an error in the water flow velocity measurement. Scattering and reflection can arise where the medium is acoustically nonhomogeneous, the latter condition being commonly caused by air bubbles or non-uniform temperature distribution in the medium.

In a homogeneous medium which is varying with time, the shape of a received pulse will vary with time and with the position of the path in the medium even though the emitted pulses are invariant in shape. However, both theory and experimentation dictate that in a system such as shown in FIG. 1 arriving pulse pairs will be substantially identical in shape provided the transducers are linear and changes in the medium are slow compared to the time of pulse propagation between two transducers. These principles are illustrated more clearly in FIGS. 2 and 3.

Figure 2:
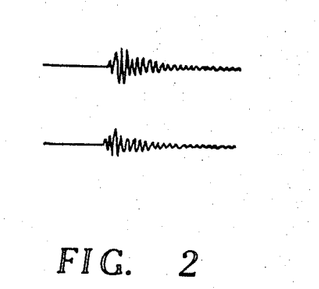
FIG 2 is an oscillogram of the pulsed waveforms observed at the output of the receiving transducers.

FIG. 2 shows a pair of pulses with opposite transmission directions observed at the output of different receiving transducers. The pulses were produced by applying an 0.2 microsecond square wave pulse to a barium titanate disc with a resonant frequency of 1.6 megacycles. The receiver used was a similar disc and the separation between transmitter and receiver was slightly more than twenty feet. Since the medium was undisturbed the pulses are identical in shape.

Figure 3:
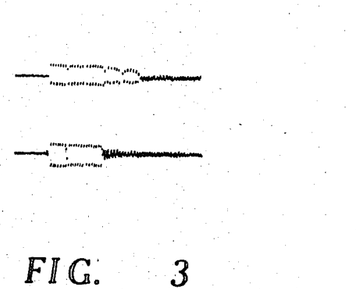
FIG. 3 represents a pair of clipped pulsed waveforms with each waveform representing an acoustic transmission in opposite directions.

FIG. 3 shows a pair of pulses, each pulse being transmitted in a direction opposite to that of the other pulse. The gain of the amplifier on the receiver was so high that the peaks were severely clipped. However, it will be observed that the variations in the wave shape of each pulse are nearly the same. The oscillogram in FIG. 3 was made when the water was violently disturbed by the introduction of jets of hot water into the acoustic path. Since pulses travelling in opposite directions are similarly affected by disturbances in the acoustic medium and since the flow velocities are determined only by the time difference between the arrival of these pulses at the receiving transducers, it is evident that the disturbances in the medium will not affect the water flow velocity measurement provided that the counter is arranged so that it measures the time of onset of each pulse. The time of onset of each pulse is proportional to the instant at which the signal crosses a given fixed threshold, and the time it takes for each pulse to reach a threshold value is substantially the same for the signals received from the two transmitting transducers.

*Brief description of invention*

Figure 4:
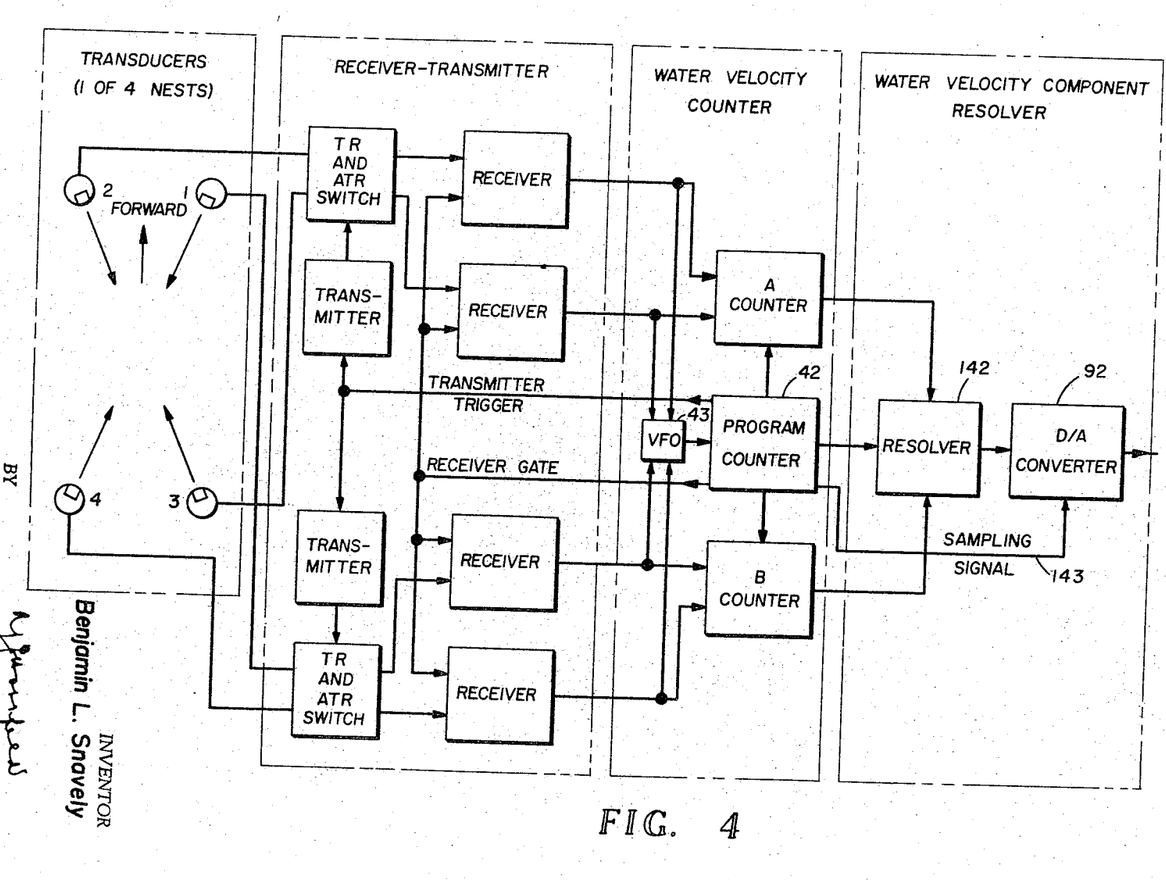
FIG. 4 is a block diagram of another form of the invention used to measure two components of water flow velocity.

In order to comprehend the functional relationship between the digital circuits in FIGS. 5 through 9, a brief functional description of FIG. 4 is given prior to a detailed circuit analysis of FIGS. 5 through 9.

The water velocity subsystem of FIG. 4 measures and iindicates two components of water flow velocity along the port-starboard, and fore-aft axes as shown. This measurement is made by sampling waterflow in paths 1–4 and 3–2.

The water velocity measurement is based on the principle that the velocity of sound in a moving body of water increases in the direction of water motion and decreases in the opposite direction. Measurement is done by simultaneously transmitting a burst of acoustical energy at both ends of the two diagonal axes in FIG. 4. The difference in receiving times of the acoustical signal at the two ends of an axis is proportional to the component of water velocity along that axis. The signal transit time along any 22 foot path between transducers is between 4.2 and 4.8 milliseconds for realistic values of the speed of sound in water. Variations in the speed of sound in water are attributed to changes in temperature, depth and salinity. Variations in signal transit time due to changes in water velocity are very small compared to expected variations in signal transit time due to changes in speed of sound in water (approximately 100–1). Consequently, any change in the speed of sound in water used to represent a change in water velocity represents a 100–1 finer measurement (increment) of water velocity change. The direction of water flow along an axis is identified by determining at which end of the axis the signal is first received. By properly summing and weighing the water velocity along the two diagonal axes, the water velocity is resolved into mutually perpendicular components of water velocity in the fore-aft and port-starboard directions.

The accurate measurement of water velocity depends on knowledge of the speed of sound in water. Since the speed of sound in water is not constant, provision is made in the water velocity subsystem of FIG. 4 to compensate for these changes. The time of arrival of the leading edge of the first received signal at any one of the four transducers is used as an indicator of the speed of sound in water. The transit time of this first signal is continuously compared with the occurrence of an internally generated timing pulse counted down from a variable frequency oscillator (VFO). The VFO frequency is automatically adjusted to synchronize the first received signal with the timing pulse.

The two transducers on one axis control the storage of VFO pulses in a counter. Two counters (A and B) are provided; one for each pair of transducers. When the first signal is received on one axis, a gate is enabled to allow counting VFO pulses into the associated A or B counter. The sign of the water velocity is identified at this time, according to which transducer first receives the signal. When the second signal is received, the VFO pulses to the counter are stopped. The number stored in the counter between start and stop pulses is proportional both to water velocity and to the speed of sound in water. However, since VFO frequency is also proportional to the speed of sound in water, this component is eliminated from the output of the counter by sampling the output for a fixed time each cycle but at a variable rate determined by the VFO frequency.

Figure 5:
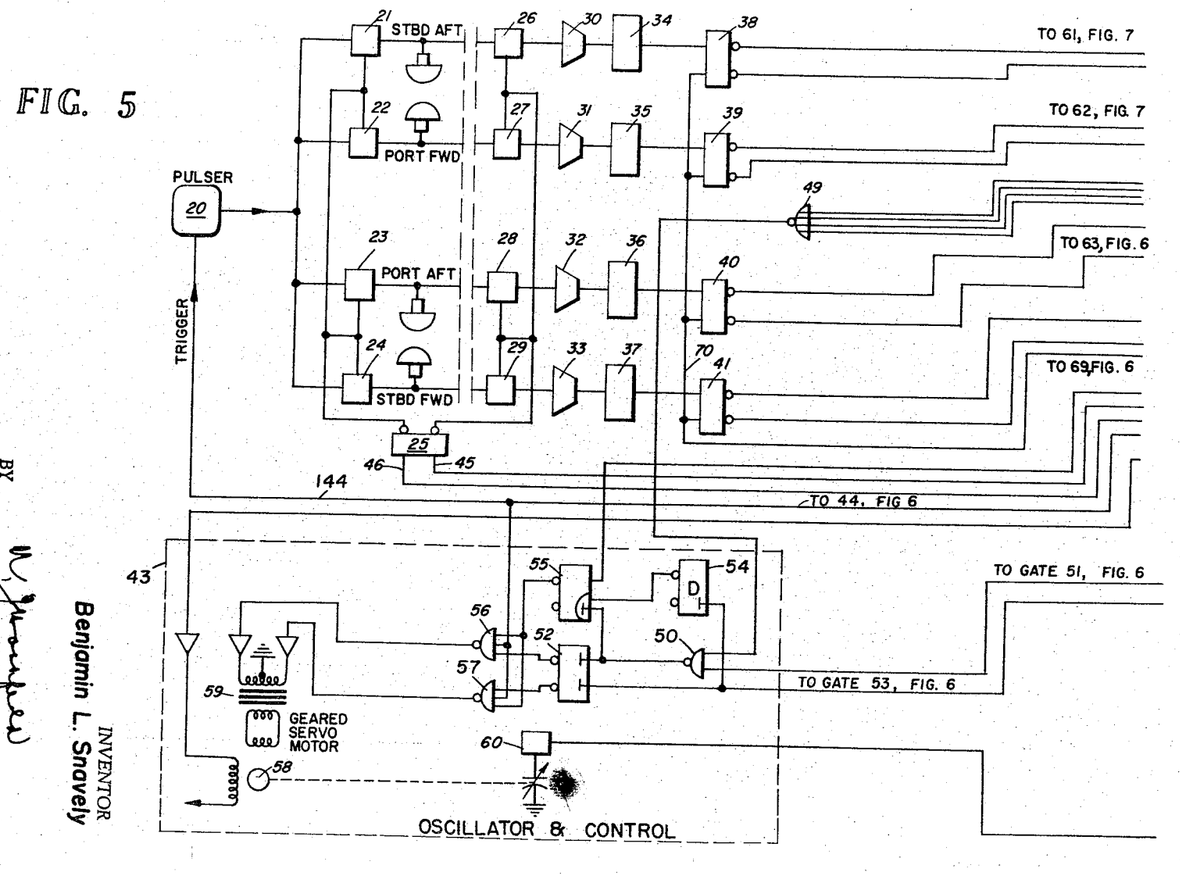
FIGS. 5 through 9 comprise a detailed schematic circuit diagram of FIG. 4.

The two transmitters in FIG. 4 or the single pulser 20 in FIG. 5 simultaneously pulses the pairs of four active, shock-excited transducers in the transducer section of the system. The transducers in turn generate a damped train of oscillations at their resonant frequency and the acoustical beams are shaped so that crosstalk is negligible between pairs. After transmission, each transducer is established in a receive mode to receive the signal transmitted by its opposite member. In FIG. 4 the transmit and anti-transmit switches (TR and ATR) prevent interaction of transmitters and receivers and may comprise any one of various types of switches which will perform this function. Four pairs of gates are shown in FIG. 5 to perform this function. See gates 21–24 and 26–29 in FIG. 5.

If waterflow exists between a pair of transducers in an acoustical path, the transmitted signal is received first at the transducer on the downstream end of the path. The first-received signal sends a start pulse to a counter that is enabled to count the VFO pulses. The second received signal (at the upstream end of the path) sends a stop pulse to the counter. The time difference between the arrival of the first signal (start pulse) and the second received signal (stop pulse) is proportional to the water velocity along the path. In FIG. 4, the start pulse for the B-counter is received at transducer probe No. 1 and the stop pulse is received at transducer probe No. 4, for water velocity in the direction shown. Similarly, the A-counter counts VFO pulses between the start and stop pulses received by transducer probes No. 2 and No. 3, respectively.

Between transmit cycles, the water velocity numbers stored in the A- and B-counters in FIG. 4 are read out serially to resolving circuits 142 on command by the program counter. The water velocity numbers are each identified with a sign to indicate the direction of water velocity. In the resolving circuit 142, the components of water velocity are summed vectorially and resolved into fore-aft and port-starboard components. The resolved water velocities are converted to analog voltages and are fed to local indicating circuits.

All functions of the system shown in FIG. 4 are timed and synchronized by the program counter 42. The program timer or counter 42 counts the pulse output of the VFO 43 and generates timing pulses at fixed points in its repetitive cycle. At the beginning of the cycle, the transmitters are triggered by the program timer 42. The transmitters generate pulses that simultaneously shock-excite the four transducers in use. Later in the cycle, the receivers are enabled and wide and narrow gates are generated to allow the received signals to control the counting of VFO pulses into the counters. A synchronizing pulse is generated that should occur at the same time as the reception of the first received signal at any transducer. If the synchronizing pulse occurs either earlier or later than the first received signal, the VFO frequency is too high or low, respectively, for the existing velocity of sound in water. Correction is exerted on the VFO frequency to align the synchronizing pulse with the first received signal. Two series of readout pulses are generated to serially read out the contents of the two counters into the resolving circuits. The read out is done so that the sign information in each counter is retained. Additional pulses are generated to update the numbers stored in the resolving circuits to conform to the changes in water velocity.

The digital water velocity information at the resolver is applied to a D/A converter 92 that changes the information into the analog form required by the indicating input of flip-flop 55. Flip-flops 52 and 55 have their outputs connected to a pair of gates 56 and 57 which provide a control signal for the geared servo motor 58 via transformer connection 59.

If the count 25,216 occurs before the arrival of the first signal received from any flow meter path, a signal will appear at the output of gate 53 before one appears at the output of gate 50. This means the counter is counting too fast and an output signal from gate 56 will then exert control on the geared servo motor so as to tune the oscillator 60 to a lower frequency. If the signal from any flow meter path occurs before the 25,216 count signal from the counter occurring at the output of gate 53, the program counter 52 is counting too slow and the variable frequency oscillator will be tuned to a higher frequency. The VFO closed loop control provides frequency correction about a quiescent value of VFO frequency where the signal from the output of gate 53 and the signal from the output of gate 49 occur simultaneously.

Figure 6:
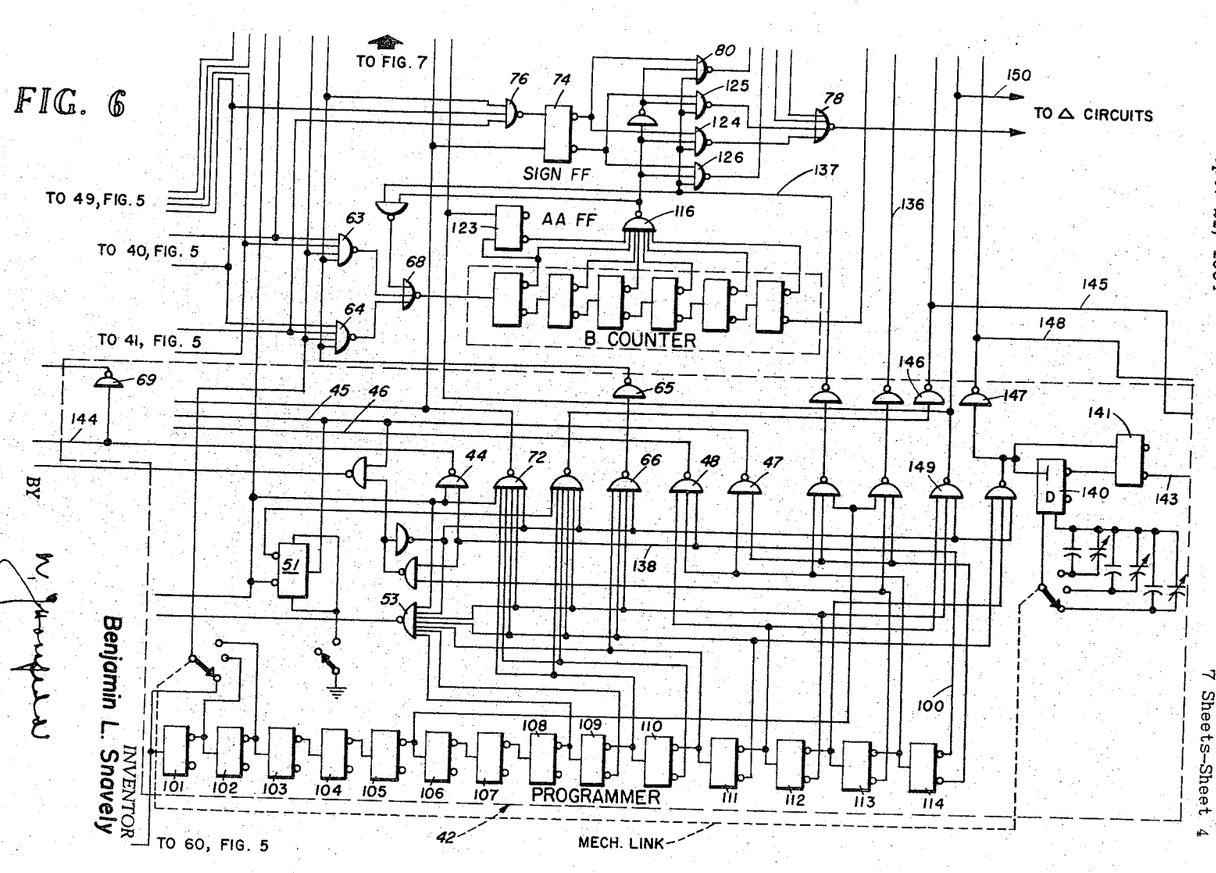

The magnitude of the water flow velocity vectors $V_a$, $V_b$ in each path of sound travel are determined by the A and B counters under the control of the associated logic shown in FIGS. 5 and 6. Each of the flip-flops 38, 39, 40 and 41 have their outputs connected as shown in FIGS. 5 and 6 to gates 61, 62, 63, and 64. Each of these gates 61–64 is additionally controlled by the output of gate 65 which has its input connected to gate 66. An output signal from gate 65 must necessarily be present at the input of gates 61–64 before signals from the flip-flops 38–41 can pass therethrough to gates 67 and 68. The sign of each vector $V_a$ and $V_b$ is also determined by the logic circuitry associated with each counter A and B.

Coincident with the transmitter triggering square wave applied to the pulsor 20 via line 144, a signal is applied through gate 69 and via line 70 to the input of each of the input flip-flops 38–41. This is a square wave signal which is applied to the four flip-flops and the signal fixes these flip-flops in their reset state at count 0 of the counter 42 and holds them in this state for the duration of the negative position of the transmitter trigger signal (8192 counts). These flip-flops are fixed at count 0 when the last flip-flop 114 changes its state and this change of state provides an output signal at gate 44. The Schmitt triggers 34–37 are thus isolated from NAND gate 61–64 and no signal is applied to the logic circuitry at the input of the A counter and B counter during this period.

From count 8704 to count 9216 a gating signal is applied from the output of NAND gate 65 to input NAND gates 61–64 enabling them to accept signals. For example a signal within this gating period from either the starboard-aft or port-forward Schmitt trigger will set the corresponding input flip-flop (generating a reset signal) and enable the VFO to drive the A counter. When the other input flip-flop for that channel is set by the slower of the two received signals from one of the transducers in that channel, the variable frequency oscillator 60 is no longer enabled and the A counter ceases to count. The number of counts A residing in the A counter at that time is proportional to the magnitude of $V_a$, the absolute water flow velocity in the port-forward–starboard-aft path. A similar sequence of events produces a number of counts B in the B counter proportional to the magnitude of $V_b$.

A signal flip-flop is associated with each counter for the purpose of determining the direction of water flow velocity between transducers in each channel. Sign flip-flop 71 is controlled by signals from NAND gate 72 which in turn is coupled to an output from each flip-flop 109–112 in counter 42. The output of NAND gate 75 also controls the state of 71. Each sign flip-flop 71 and 74 is fixed in its reset state at count 8448. The output from NAND gate 65 also controls the conduction of NAND gates 75 and 76 connected to one input terminal of each sign flip-flop 71 and 74.

If for example in the channel with the A counter the starboard-aft signal arrives first, the sign flop-flop 71 for the A counter will remain in its reset state. If the port-forward signal arrives first, the A counter sign flip-flop changes to its set state due to the input signal coupled through conductor 77 from the output of flip-flop 38. Thus the direction of $V_a$ may be determined by the state of the sign flip-flop 71. Similarly the B counter sign flip-flop remains reset if the port-aft signal arrives first and changes to the set state if the starboard-forward signal arrives first, thus determining the direction of $V_b$.

The count in both the A and B counters is applied respectively through NAND gates 115 and 116 to the output logic circuitry associated therewith, and the outputs of the sign flip-flops 71 and 74 are passed to the output logic circuitry associated with counters A and B, the description of which will follow.

The output of the counterdrive flip-flops 38–41 (see FIG. 5) controls the counting of VFO pulses in the counter. A gate signal, generated by the program timer, prevents triggering of the counter-drive flip-flop except during the time when a signal is expected to arrive from the triggering circuit. This minimizes erroneous triggering by noise.

If the signal from gate 49 occurs before the count of 8,832 or if no signal is received from the gate, the motor operates to increase the frequency of the oscillator. If the signal occurs after 8,832 but before 8,832+D where D is the equivalent count corresponding to the delay introduced by the delay multivibrator 54 there is no change in oscillator frequency. If the signal occurs after 8,832+D the motor operates to decrease the frequency. D may be equivalent to about 10 or 20. Its purpose is to prevent excessive operation of the motor with consequent wear on the bearings therein.

The A counter counts and stores the number of VFO pulses that occur between the start and stop siganls generated by the port-forward and starboard-aft threshold and counter drive circuits. The actual number of VFO pulses stored in a given time depends on the VFO frequency. The VFO frequency varies between 5.2 and 6.0 mc. depending on the change of the speed of sound in water. At the minimum and maximum VFO frequencies, the 256-count capacity of the A counter is attained with water velocities of 13.84 and 15.38 knots respectively. The maximum measurable non-ambiguous water velocity, therefore, is determined by the speed of sound in water and the corresponding VFO frequency.

For increasing speed of sound in water, the shortening of the time between start and stop pulses has greater effect on the number stored than the corresponding incerase in VFO frequency. Therefore, the actual number stored in the A counter for a given water velocity decreases when the speed of sound in water increases. This effect is compensated by sampling the final output of the water velocity system at a rate determined by the VFO frequency.

Between predetermined cycles of the program timer (referred to as transmit time $T_0$) 512(2U) readout pulses at one-sixteenth the VFO frequency are fed to the A counter via line 136. The manner of readout depends on the condition of the sign gate associated with the A and B counters shown in FIGS. 6 and 7. For the reset flip-flop sign at 71, 256 pulses plus the stored number ($U+A$) is read out. For the set flip-flop sign at 71, 256 pulses minus the stored number ($U-\overline{A}$) is read out. For description, A is defined as the number of additional counts required to fill the A counter to its 256-count capacity (i.e. $A+\overline{A}=256$). For positive sign, no output is produced until A readout pulses are added to the number stored in the A counter. When the A counter is filled, the remaining readout pulses are fed to the output and the number of pulses (512) fed out equals $2U-\overline{A}=U+A$. For negative sign, the readout pulses are fed to the output only until the A counter is filled; the remaining readout pulses are not used. The number of pulses fed out equals $\overline{A}=U-A$.

circuits. The program timer 42 then triggers a sampling circuit which samples the analog fore-aft and port-starboard water velocity outputs available to the indicating circuits. The average indicator reading depends on the duty cycle of this sample period.

As the VFO frequency is increased the off-time between sampling periods shortens in accordance with sampling signals over line 143 and therefore the indicating circuits receive inputs during a larger portion of the cycle. This produces larger indications for given numbers stored in the counters to compensate for the fact that less VFO pulses are stored at high values of speed of sound in water than at low values. A scale factor correction is added to the water velocity output signals corresponding to the trigonometric functions required to resolve the components into true fore-aft and port-starboard velocities.

Where a single pulser (transmitter) is used such as is shown in FIG. 5, or where two transmitters are pulsed simultaneously as shown in FIG. 4, the transmitters are pulsed from the program counter at the beginning of each cycle of the counter. The transmitters generate pulses (one for each transmit trigger) to the transducers at a pulse rate frequency (PRF) between approximately 160 and 130 c.p.s. The PRF depends upon the frequency of the VFO and the VFO in turn determines the cycle rate of the program timer. The output pulse is approximately 0.3 microsecond wide so that the entire transducer excitation occurs during one-half cycle of the natural resonance frequency of the transducers which is in the vicinity of 1635 kc. This results in shock excitation of the transducers at their natural resonant frequency.

The TR and ATR switching in FIG. 4 is provided to facilitate the use of a common transducer for both transmitting and receiving functions. The TR and ATR switching may be accomplished by fast acting switches to disconnect the receiver from the transmitter during the period when transmitting, and to disconnect the transmitter when energy is being received. Because of the great disparity in transmitted and received powers, voltage breakdown devices (semiconductor diodes) are used to perform the necessary switching operations.

The receiver circuits shown in FIG. 4 in block diagram form amplify, limit and detect the acoustical signal received by the transducers. One receiver is provided for each transducer and two receivers operate as a balanced pair at opposite ends of a path as shown in FIG. 5 and discussed more fully hereinafter with reference to FIGS. 5 through 9. The gain of each receiver should be sufficient to produce saturation limiting on received signals and thereby provide a sharp trigger to the signal processing circuits. Receiver gains associated with one path should be balanced so that the signal processing circuits can be triggered at the same point on the leading edge of the received signal.

*Detailed description of invention*

The transmitter pulser 20 is connected to a pair of transducers in each channel via two pairs of gates 21, 22 and 23, 24. These gates are opened and closed in accordance with the potential on one output of flip-flop 25. The control of this flip-flop will be described in detail later in connection with the description of the programmer circuitry of FIG. 5. Each channel has another pair of gates 26, 27 and 28, 29 connected to the other output of flip-flop 25. These gates are closed when the other gates are opened and vice versa in accordance with the state of bistable flip-flop 25. This gating action allows the four transducers to assume both the projector role and the hydrophone role for alternate states of the flip-flop 25.

The pulser 20 may be a line type pulser consisting of a reservoir of electrical energy that is allowed to discharge completely into a load at predetermined times to form the pulses. Pulser 20 should be connected to a source in such a way that the same amount of energy is stored in it during each interpulse interval.

Four identical receiver-limiting amplifiers 30, 31 and 32, 33 are connected as shown in the two channels. The function of the limiting amplifier is to suppress all the amplitude variations in the incoming signal. In the signal processing system of FIG. 5 the limiting amplifiers function to suppress a predetermined portion of the received RF pulse by imposing a minimum acceptable amplitude threshold and to produce a constant amplitude output from that portion of the received pulse which exceeds the sharp limiting threshold. This output, essentially a square wave at the transducer frequency, drives the Schmitt trigger circuits 34, 35 and 36, 37.

The outputs of the Schmitt triggers are connected respectively to the inputs of four flip-flops 38, 39, 40 and 41. The switching of these flip-flops is controlled by signals from a 14 bit digital counter 42 driven by a variable frequency oscillator (VFO) 43. The bit length of the counter 42 and the frequency range of the oscillator 43 were selected in consideration of the following: (1) that the path length between transducers lies between 22.12 feet and 21.95 feet; (2) that the sound velocity in water will range from a maximum of 52.10 feet per second to a minimum of 45.90 feet per second and (3) that the time of transient of sound travelling from one transducer to another will not exceed a maximum of 48.19 microseconds or fall below a minimum of 42.13 microseconds.

The fourteen flip-flop program counter 42 when driven by the VFO 43 continuously cycles through its 16,384 states or counts. Various decoding gates connected to the outputs of certain ones of the counters in the chain select specific counts to serve as timing control signals.

Flip-flop 51 permits emission of pulses only on alternate cycles of the programmer when the switch associated with flip-flop 51 is in the position shown. Under these circumstances the PRF is 130–160 c.p.s. not more than one pulse in each direction is in the water at the same time. When the switch is closed the PRF is doubled and at times there will be two pulses in the water in a given direction at the same time.

The trigger pulse is sent to the transmitter pulser 20 via connector 43 which is connected to gate 44 (see FIG. 5). If the VFO 43 is locked on to a preselected cycle time of the counter, the transmitted pulse at 20 will be received 25,216 counts after transmission. Since the counter has recycled once in this many counts, the state of the count will actually be 8,832 when reception occurs since the counter has 16,384 states.

In order to insure reception at count 25,216 the VFO is tunable over a frequency range of approximately 5.2 to 6.0 megacycles. These limits correspond to the respective minimum and maximum values of transient time given above. Flip-flop 25 having its two output terminals connected to the pairs of gates on opposite sides of the pairs of transducers, controls the conduction of these gates in a manner such that the gates 21–24 between the pulser 20 and the transducers are closed only for a discrete time period after the pulser is energized, after which time the gates 26–29 between the transducers and the signal processing system output become conductive. This conduction is controlled by the flip-flop 25 having its input connectors 45 and 46 connected to gates 47 and 48. The opening and closing of gates 47, 48 is determined by the conductive state of the various counter stages coupled thereto.

The gate 49 has its four inputs connected to an output of each of the four flip-flops 38–41 and has a single output connected to gate 50. Gate 50 has its other input connected to an output of the one-stage set and reset counter 51 and its output connected to one input of the flip-flop 52. The other input to flip-flop 52 is connected to gate 53 which in turn is connected to seven of the 14 stages in the programmer 42.

Gate 53 is also coupled to a delay multivibrator 54 which in turn exerts timing control on the gates A.C.

In the case of a zero reading in the counter, the anti-ambiguity flip-flop 123 provides, up to the time of the first readout pulse, and inhibiting signal to gate 115 so that this gate provides an enable signal to gate 121 up to the $U$th readout pulse. After the $U$th pulse, gate 121 is inhibited and an enable signal is applied to gate 79 through complementary gate 122. In this way, output is produced either during the first 256 readout pulses (for negative sign), or during the second 256 readout pulses (for positive sign). In either case, the number of output pulses is $256=U\pm A$. If the counter capacity is exceeded, an overflow alarm circuit, to be described in somewhat more detail later, indicates that incorrect water velocity indications are being generated.

The B counter is functionally identical to the A counter described in the preceding paragraphs, except for the output arrangement. The B counter counts VFO pulses corresponding to the magnitude and direction of water velocity along the starboard-forward and port-aft axis. Readout is accomplished by 512 readout pulses occuring immediately after the A counter readout pulses and applied to gate 68 via line 137.

The $U+B$ and $U-B$ numbers read out in the same manner as the A counter are both connected to the output on each readout cycle. Both numbers are required in the resolving circuits to resolve the water velocity into fore-aft and port-starboard components. The condition of a sign gate in the B counter determines the destinations of the $U+B$ and $U-B$ numbers.

The variable frequency oscillator (VFO) provides the clock pulses for the system timing and the VFO pulses drive the program counter which generates all of the control, timing, and gating pulses required by the water velocity subsystem. The VFO pulses are counted into the A and B counters between the arrival times of the acoustical signals, along their respective axes, to measure water velocity. The VFO frequency is automatically adjusted between its 5.2- to 6.0-mc. limits as a function of the speed of sound in water. This frequency range is adequate to accommodate any realizable speed of sound in water.

The VFO frequency is adjusted by comparing the time of occurrence of the first received signal from any transducer with the 25,216th VFO pulse (synchronzing pulse) after $T_0$. The synchronizing pulse is derived from the program timer, and the VFO frequency is adjusted upward, or downward, depending on whether the synchronizing pulse occurs later or earlier, respectively, than the first received signal. VFO correction is exerted continuously, alternating between upward and downward frequency change, to keep the synchonizing pulse occurring approximately the same time that the first received signal occurs. The VFO correction rate is sufficiently rapid to maintain synchronism with any expected rate of change in the speed of sound in water.

The received signals should occur within a narrow gate extending from count 25,216 to 25,728. The narrower gate begins 256 pulses before, and ends 512 pulses after the synchronizing pulse. This arrangement is desirable since, although the first received signal should occur close to the synchronizing pulse, the remaining three signals must occur later within the gate. If no signals are received within the narrow gate due to large VFO error, equipment malfunction, or bubbles in the path, a hold signal is generated that stops VFO tuning and triggers a timing circuit including flip-flops 54 and 55. During the period of the timing circuit the VFO will hold its last frequency setting, and if no signals are received within the narrow gate before the period of the timing circuit ends, a 0.8-millisecond wide gate is enabled that allows frequency correction by any received signal occurring any time in the receiver enable time. Normal operation resumes when the VFO frequency is corrected so that a received signal appears within the narrow gate.

The program counter circuit sequences the entire operation of the water velocity system, and timing is accomplished by using a 14-bit digital counter driven by the variable frequency oscillator (VFO). Decoding gates are connected to various counter outputs to establish the precise timing pulses required for system operation. The program counter period is 16,384 counts and the length of time for the 16,384 counts to occur depends on the VFO frequency. The VFO frequency varies directly proportional to any change in the speed of sound as detected by the threshold circuit.

The program counter also triggers the transmitter and receiver into operation and enables circuitry that tests for abnormal conditions and triggers alarms when abnormal conditions occur. The rate of the program counter period (16,384 counts equals 1 period), which is equal to VFO $\times$ $2^{-14}$ is used as an indication of the speed of sound in water. During operation, this signal also indicates whether or not the VFO is operating. When the VFO$\times 2^{-14}$ signal is not present from the program counter, an alarm is initiated indicating that the VFO has stopped oscillating. The VFO$\times 2^{-14}$ signal is also one of the signals used as a reference in the VFO input circuit to control the VFO frequency and applied via line 138 to the VFO circuit.

The A and B counter outputs pass serially into the fore-aft and port-starboard registers. Each resolver driver circuit receives the single output of the A counter ($U+A$ or $U-A$). One resolver driver output receives the $U+B$ output of the B counter; the other receives the $U-B$ output. The choice of the B counter outputs for connection to a specific resolver driver circuit depends on the B counter sign gate.

The port-starboard and fore-aft resolver registers and counters (shown as sigma and delta circuits in FIGS. 5–9) are functionally identical; therefore the following discussion concerns only the fore-aft circuits. The method by which the two counter and register circuits, working together accomplish the resolution is given below. Referring to FIG. 8, the register shown therein is a serial binary counter with parallel clear inputs and the counter is an up-down counter that is enabled to count up or down by the condition existing in the register at the end of a cycle. The number stored in the complement of the number is in the up-down counter plus the water velocity number read into the register.

Two outputs are available from any binary counter: the stored number at the 1 outputs, and complement of the stored number at the 0 outputs. The stored number from the counter is connected to the inputs of D/A converter. The complement of the stored number is connected to AND gates in series with the set inputs of the register. At the beginning of a resolver cycle, each AND gate 85 in series with the complement inputs to the register is enabled. The complement of the number stored in the counter is transferred to the register. A binary number sum and its complement yields a full counter (all flip-flops in the 1 condition). The A and B counter outputs are read into the resolver register and the counter is exactly filled if the new number equals the stored number. An increase-decrease flip-flop 83 detects whether the register is overfilled or under-filled by the sum of the new number and complement of the preceding numbers. If the register is exactly filled or less than filled, the increase-decrease flip-flop establishes the condition for counting down in the counter. If the register is over-filled the increase-decrease flip-flop enables upward counting. An up-down counter, as used in the resolver, is a serial triggered binary counter in which succeeding stages are triggered either by the 1- or 0-outputs of preceding stages. When up-counting is enabled, each stage after the input flip-flop is triggered by the 1 output of the preceding stage. When down-counting, triggering is enabled by the 0 output of the preceding stage. An advanced pulse triggers the input flip-flop of the up-down counter at the end of the resolver cycle advance pulse. The up-down counter counts up one or down one depending on the sum in the register. This adjusts the number sent to the D/A converter one least significant bit toward coincidence with the true water velocity. If no change takes place in the water velocity system, the counter and register oscillate one count about the coincidence point. The rate at which the counter is corrected (one digit per cycle) is sufficient to maintain synchronization with any expected change in water velocity and the speed of sound in water.

The total capacity of the resolver counter and register is twice the sum of the capacities of the A and B counters (4U—1024). This allows both negative and positive numbers to process. In the output, the number 512(2U) contains the identity of zero. Numbers less than 512 are negative; those more than 512 are positive.

The equations defining the resolution being performed are as follows:

(1) $$V_{\text{fore-aft}} = \frac{(V_a + V_b)}{2 \cos \phi}$$

(2) $$V_{\text{port-starboard}} = \frac{(V_a - V_b)}{2 \sin \phi}$$

where $\phi$=angle between fore-aft axis and A or B transducer axis. Since the angle $\phi$ is a constant, the trigonometric portions of the preceding equations are also constants. These constants are entered into the resolved water velocities after conversion to analog quantities. The fore-aft resolver sums the numbers in the A and B counters, and the port-starboard resolver sums the A counter output with the negative of the B counter output.

The fore-aft and port-starboard digital-to-analog converters are functionally identical; therefore only one is described. The D/A converter changes the digital quantity in the resolver output to an analog voltage proportional to the digital number. The output is weighted so that an input of 512(2U) produces 0 volts output. Input numbers less than and more than 512 produce negative and positive outputs, respectively.

The D/A converter can be considered as a set of switches that connect either a negative or positive voltage onto appropriate locations on a resistive summing line. The negative voltage corresponds to binary 0, the positive to binary 1. The two supply voltages are +10 and —10 volts and the switch nearest the output of the resistive network (most significant bit) has twice the effect on the output voltage as the next switch from the output. Similarly, the effect of succeeding less significant switches decreases in powers of 2 through the switch furthest from the output (least significant). The smallest increment of change in a 10-bit D/A converter is $\frac{1}{1024}$ the full supply voltage (20 volts). The D/A converter changes in 19.5-millivolt steps from —10 volts, through 0 volts to +10 volts, corresponding to input numbers from 0 to 1023. An output of 512 yields 0 volt output (zero water flow).

The D/A sampling circuit including delay multivibrator 140, flip-flop 141 and the associated variable capacitance network shown in FIG. 6 removes the remaining error in the water velocity information due to the speed of sound in water. For a given water velocity, the number stored in A and B counters decreases with increasing speed of sound in water. This effect is only partially compensated by the additional VFO pulses counted into the counters from increasing VFO frequency. The remaining compensation is performed by increasing the average analog output of the water velocity system as VFO frequency is increased.

The D/A sampling circuit connects the analog output of the D/A converter to flip-flop 141 in the sampling circuit which provides pulses of fixed width. Since the period of a transmit cycle varies inversely as the VFO frequency, the off-time between sampling periods becomes shorter as the VFO frequency increases. Therefore, greater average output is connected to the output of the D/A converter with increasing frequency. The effect of the speed of sound in water is removed and the output of the D/A converter indicates true water flow velocity.

*Detailed description of counting, resolution and D/A conversion*

Figure 7:
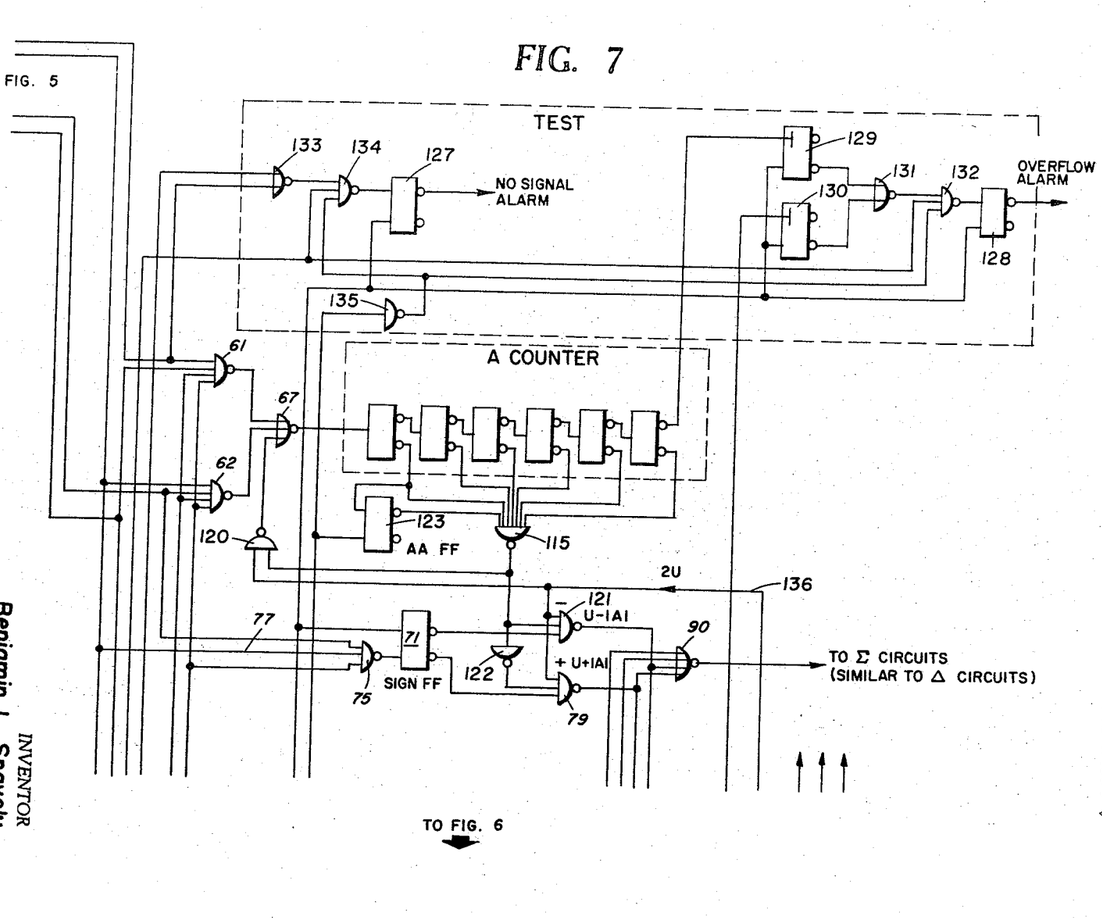
Figure 8:
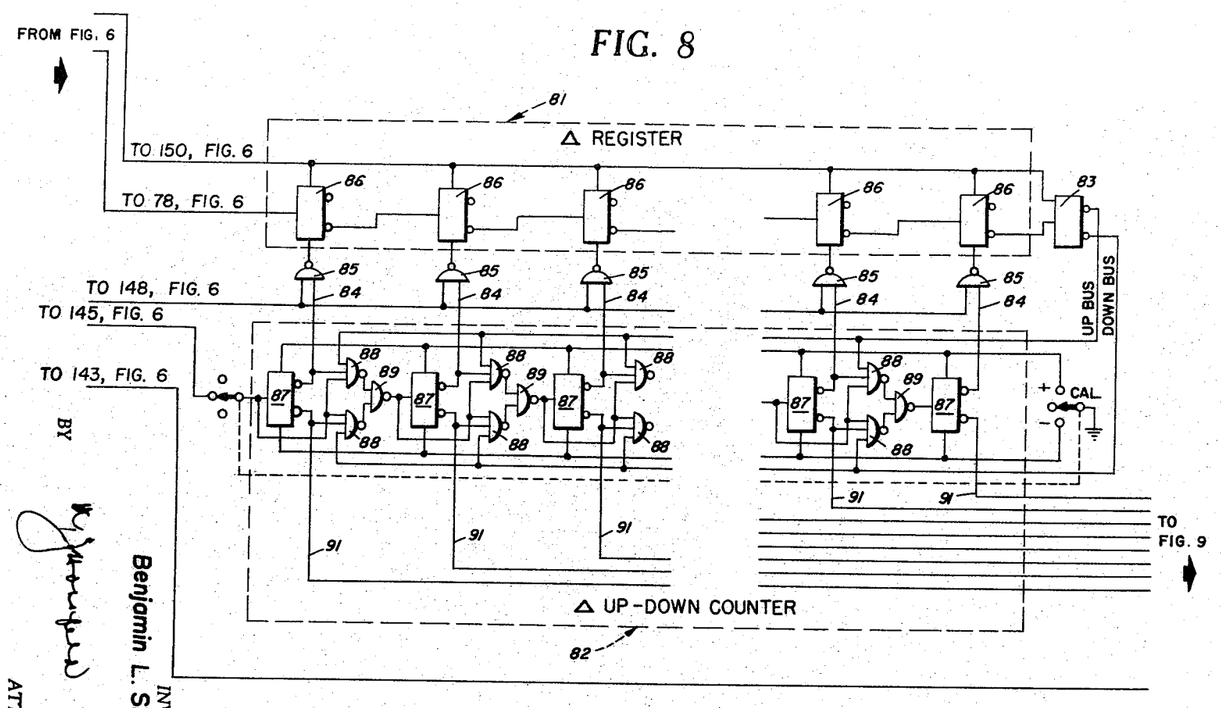
Figure 9:
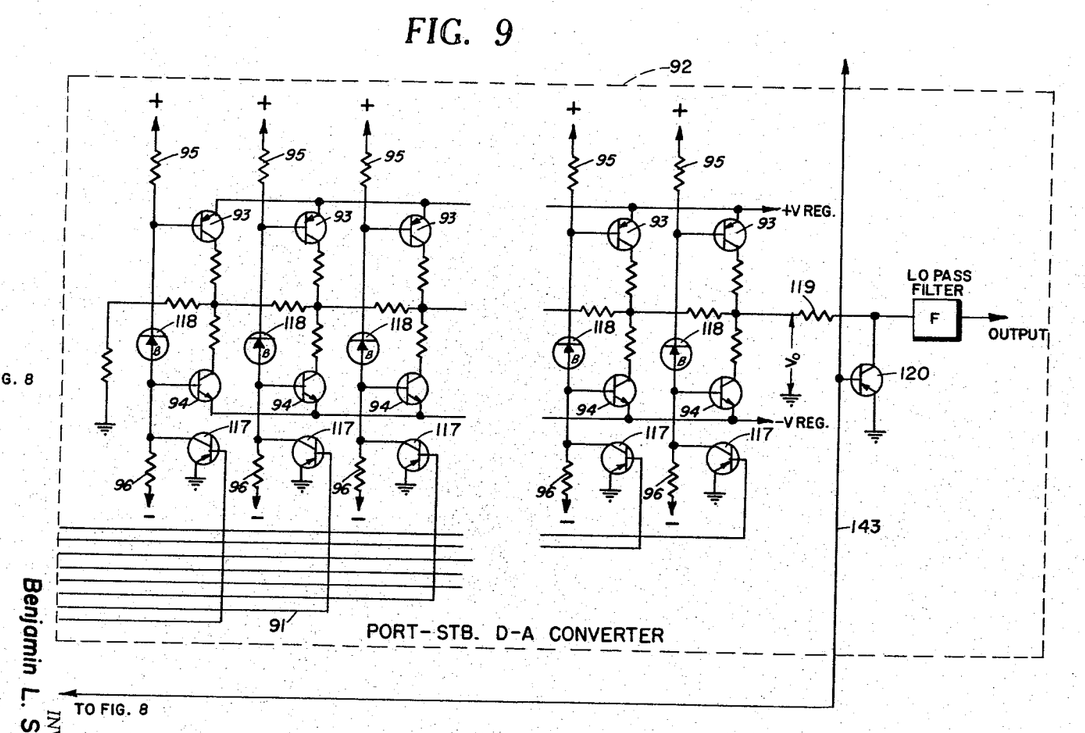

The A-counter in FIG. 7 counts and stores the number of VFO cycles that occur between the time of receiving the simultaneously transmitted signals at the starboard-aft and port-forward transducers. The difference between receiving times (and the resulting number stored in the counter) is proportional to the component of water velocity along the line joining the two transducers. The direction of water velocity is identified by the transducer that first receives the signal. The first-received signal sets sign flip-flop 71 that determines the character of the counter output. The stored number is read out of the A-counter by a series of 512 readout pulses from the program timer in FIG. 6. Part of the 512 readout pulses are fed into the A-counter and to the output. The part fed out is determined by the count stored and the sign. Under the set condition of the sign flip-flop 71, output pulses are produced from the beginning of the 512 readout pulses until the 256 count capacity of the A-counter is attained. In this case, 256(U) counts minus the number originally stored in the A-counter are generated; the rest of the 512 readout pulses are not used. Under the reset condition of the sign flip-flop 71, output is inhibited until the A-counter is filled by readout pulses. This occurs when the stored number plus the readout pulses equals 256. The remainder of the 512 readout pulses are fed to the output. In this case, 256 pulses (U) plus the stored number (A) are read out.

The first received signal at the input of flip-flop 38 or 39 sets the flip-flop by its leading edge. The narrow gate from the output of 38 or 39 enables one input of gates 61, 62, and 75 at a time bracketing the arrival of the received signal from both transducers. If the starboard-aft signal is received first, the enable signal applied to one input of sign gate 75 is removed by the 0 at the reset output of flip-flop 39. Therefore sign flip-flop 75 stays in the reset condition. Starboard-aft input gate 61 is enabled at three of its inputs by the set output of flip-flop 38, the reset output of flip-flop 39 and the narrow gate signal. VFO signal is connected through starboard-aft input gate 61 to one input of A-counter input gate 63. The VFO pulses are counted into the 6-stage A-counter composed of the six bistable stages shown in FIG. 7. When the second signal is received (port-forward in this example) the leading edge of the first pulse sets flip-flop 39 and removes the enable signal at starboard-aft input gate 61, previously provided from the reset output of port-forward flip-flop 39. The VFO pulses are removed from the A-counter by this action. The number now stored in the counter is proportional to the time between receiving the signals at the starboard-aft and port-forward transducers. Alternately, if the port-forward signal is received first, sign flip-flop 71 is set and the input to counter input gate 63 is fed through port-forward gate 62.

The readout is driven by 512 counts from the program timer 42 connected in parallel to the output gates 79, and is fed to the input of the counter through gate 120. The A-counter begins counting the first portion of the 512 readout pulses. As soon as the 256 count capacity of the A-counter is reached by adding readout pulses to the stored number, the output of gate 115 inhibits gate 120 and stops the counter in the full condition. Depending on the condition of sign flip-flop 71, the sign input to the output gate 79 or 121 is enabled; the other gate is inhibited. During the time the counter is filling to capacity, an enable signal is connected from counter output gate 115 to the output gate 79. If the sign flip-flop 71 output enables output gate 79, the number of readout pulses fed into the A-counter are also fed to the output through the output gate 79. As soon as the A-counter is filled to its 256-count capacity, output gate 115 provides an inhibit signal at the input of gate 120. The remaining readout pulses are prevented from reaching the counter input by the action of 120. As a result, the counter stays in its full condition. Counter output gate 115 connects an inhibit signal to output gate 79 and the remaining 512 readout pulses are prevented from appearing at the output gate 79. The counter output gate signal is inverted in gate 122 and provides an enable signal at the input to output gate 121. If the sign flip-flop input enables the output gate 121 the rest of the 512 readout pulses are connected to the counter output.

The B-counter, shown in FIG. 6, is functionally identical to the A-counter described above, except for differences in the output gating circuits. The B-counter stores a number proportional to the component of water velocity along the line joining the port-aft and starboard-forward transducers. The readout sequency for the B-counter is driven by 512 readout pulses from the program timer that occur immediately after A-counter readout is completed.

In any condition of sign flip-flop 74, one output of 256(U) minus the stored number (B), and one output of 256(U) plus the stored number (B) is produced. When the 0 output of sign flip-flop 74 provides an enable signal to output gates 80 and 124, the $U+B$ number is read out through gate 80 and the $U-B$ number is read out through gate 124 to the port-starboard (delta) register. The method of obtaining the $U+B$ and $U-B$ numbers during readout is identical to the method described for the A-counter. In the opposite condition of the sign flip-flop 74, the $U+B$ number is read out through gate 125 to the port-starboard register and the $U-B$ number is read out through gate 126 to the fore-aft register.

The fore-aft summation register and counter shown in FIG. 8 stores the number representing the component of water velocity in the fore-aft direction. The complement of this number is transferred to a register preceding the readout time of the A- and B-counters. The contents of the A- and B-counters are added to the complement in the register.

Assuming unchanged water velocity, the sum of the number and its complement will yield a full register. When the A- and B-counters are read into the register an increase-decrease flip-flop 83 enables each stage in the up-down counter to count in the decreasing direction. The next incoming counter advance pulse subtracts one count from the up-down counter. When the stored complement is transferred into the register on the next cycle, its value is increased by one. Again assuming constant water velocity, the complement plus the A- and B-counter numbers exceeds the register capacity. The register output sets the increase-decrease flip-flop 83 so that it enables the up-down counter to increase. The next counter advance pulse adds one count to the up-down counter. The increase-decrease flip-flop 83 stays cleared in this circumstance and the up-down counter is enabled to subtract one count on the next advance pulse. This analysis shows that with constant water velocity, the up-down counter alternately adds and subtracts one count on succeeding transmit cycles upon attaining the value for the velocity measured. With an increase or decrease in the water velocity along the fore-aft axis, the counter is enabled to increase or decrease its stored number at the rate of one count per transmit cycle until coincidence is obtained between the stored and incoming number. When coincidence is achieved, the one-count oscillation about the coincidence point is resumed. The counter output is fed in parallel to the D/A converter shown in FIG. 9.

In a binary counter, two numbers are continuously available—the stored number at the 1 output and the complement of the stored number at the 0 output. The sum of a binary number and its complement fills the counter to its capacity so that each flip-flop is in the 1 condition. Adding a single count to a filled counter clears the counter, placing each flip-flop in the 0 condition. The number stored in the up-down counter of FIG. 8 composed of flip-flops 87 is connected from the 1 outputs in each of the flip-flops 87 to the D/A converter as shown. The complement of the stored number is connected from the 0 outputs of flip-flops 87 to one input of each of gates 85. At a time preceding the readout of the A- and B-counters, an enable signal is connected to the second input of each of gates 85 and the complement of the stored number is transferred in parallel through the gates 85 into the register composed of flip-flops 86. The readouts from the A-counter ($256+A$ or $256-A$) and the B-counter ($256+B$ or $256-B$) are fed serially to the trigger input of the initial flip-flop 86 and the remaining flip-flops of the delta register 81.

If the water velocity is unchanged since the last readout, the number in the up-down counter 82 and the number fed into the delta register 81 should be equal. In this case, the number plus its complement places all flip-flops in the register 81 in the 1 condition. Increase-decrease flip-flop 83 is controlled by the output of the final flip-flop in the register. In the full condition of the register established in the preceding sentences, increase-decrease flip-flop 83 stays in the 0 condition since it does not receive the required negative-going trigger signal. Increase-decrease flip-flop 83 enables the up-down counter 82 to decrease its count in the following manner: (1) each gate 88 receiving the 0 output of a counter stage is enabled at one output by the 0 output of increase-decrease flip-flop 83; (2) each gate 88 receiving the 1 output of a counter stage 87 is inhibited; (3) the two additional inputs to each 0 gate 88 receive the output from the preceding flip-flop and the trigger signal from the input to the preceding flip-flop.

The operation of the second flip-flop in the counter 82 and its input gates 88 is described for illustration. One input of gate 88 is enabled by the output of increase-decrease flip-flop 83. Gate 89 connects any signal output from gates 88 to the trigger input of flip-flop 87. Input flip-flop 87 is in the 0 condition and a second input of gate 88 is enabled. The incoming advance pulse, occurring once each transmit cycle, bypasses input flip-flop 87 and is connected to the next pair of gates 88 coupled to the output of input flip-flop 87. An output from one of gates 88 then triggers the next flip-flop 87.

The complement of the stored number is increased by one when the stored number is reduced by one, and the flip-flops in the register and the increase-decrease flip-flop 83 are cleared at the end of the cycle by a pulse from the programmer 42. When the complement of the stored number is transferred through the gates 85 into the register and the A- and B-counter outputs are added to it, the sum exceeds the register capacity by one (assuming no change in water velocity). Each flip-flop in the register 81 is triggered to 0 on the final input pulse. Increase-decrease flip-flop 83 is triggered by the negative-going signal as the final register flip-flop 86 is triggered to 0 by the final input pulse. The 1 output of the increase-decrease flip-flop 83 enables one input of each gate receiving the 1 output of the counter and inhibits the gates receiving the counter 0's. This establishes the condition for the up-down counter to increase on the next advance pulse.

In the manner just described, the counter output oscillates one count about the stored number for unchanged water velocity. When the water velocity increases or decreases, the stored number continues to increase or decrease one count per transmit cycle until coincidence is attained. In the one-count oscillation, about the coincidence value is resumed.

The port-starboard (sigma) summation register and counter operation is identical to the fore-aft summation register and counter described.

The digital-to-analog (D/A) converter 92 has a plurality of input connections 91 which are each connected to an output of a different counter stage 87 in the delta up-down counter. The state of each of the counter stages 87 in the delta up-down counter will determine whether a positive or negative pulse is applied to the control transistors 117 associated with each successive stage of the D/A converter.

The D/A converter 92 consists essentially of a plurality of cascaded transistor stages, each including a PNP transistor 93 and an NPN transistor 94. The bases of the transistors 93 and 94 are connected to the anode and cathode electrodes respectively of the Zener diodes 118 which, in combination with the positive and negative voltage sources associated with each transistor, provide the proper reverse bias on the transistor bases.

The emitters of the NPN transistors 94 are connected to the negative voltage bus in the D/A converter. When the control lead to the base of each PNP control transistor 117 is positive, the voltage on the collector of each PNP transistor 93 is equal to the positive bus voltage and the collector of each NPN transistor 94 is effectively disconnected from the negative voltage bus. A negative voltage on the bases of the control transistors 117 places the collectors of the NPN transistors 94 at the negative bus potential and isolates the collectors of the PNP transistors 93 from the positive bus.

Each of the two resistors interconnecting the collectors of transistors 93 and 94 is equal to 2R and each of the resistors coupling the successive stages in the D/A converter is equal to R. Where the combined impedance of resistor 119 and transistor 120 is Z and the output voltage between the collector of 120 and ground is $V_0$, it can be shown that $$V_0 = -V\frac{Z}{R+Z}[\frac{1}{2}(-1)^{\epsilon_1}+(\frac{1}{2})^2(-1)^{\epsilon_2}+(\frac{1}{2})^3(-1)^{\epsilon_3}\ldots(\frac{1}{2})(-1)^{\epsilon n}]$$

when the binary number in the counter 82 is $\epsilon_1 \epsilon_2 \epsilon_3 \ldots \epsilon n$.

The clamping transistor 120 across the output of the system and the resistor 119 between this output and the output of the D/A converter holds the system output at ground potential except during time intervals of fixed length which immediately follow the change in count on the D/A converter. Thus the output consists of a series of pulses, the height of which depends upon the count on the D/A converter and the rate of which is proportional to the sound velocity in water while the pulse width is invariant. This form of output serves two purposes; it suppresses transients in the output due to switching in the D/A converter and it introduces a factor into the output proportional to the sound velocity, thus canceling an inverse factor introduced earlier in the system.

The alarm circuits shown in FIG. 7 monitor selected major voltages and/or signals in the water velocity system.

A no-signal and overflow alarm circuit having output flip-flops 127 and 128, respectively, detect the absence of a signal at any one or more transducers and/or excessive count in either the A- or B-counter. The no-signal-alarm circuit in FIG. 7 has flip-flop 127 which is triggered by an output from gate 134 which in turn is controlled by the gate 133 having a pair of inputs connected to the outputs of flip-flops 38 and 40 of FIG. 5. By the simultaneous application of signals at the input of gate 134, flip-flop 127 will be triggered to generate a hold signal that prevents any change in the number stored in the counter circuit of FIG. 8. Similarly, upon the simultaneous application of signals at the input of gate 132, a trigger signal will provide a hold signal at the output of flip-flop 128 to prevent any change in the number stored in the counter circuits of FIGS. 6 and 7. Signals generated at the output of 128 and caused by an overflow from the A- or B-counter indicate that the water velocity is exceeding the capacity of the system. Signals generated at the output of 127 indicate a loss of one signal at one or more of the transducers.

The first three stages of the programmer 42 are alternately connectable via the 3-position adjustable switch shown in FIG. 6 to the inputs of gates 61–64. This adjustable switch is provided so that the number read into the A and B counters can be varied as the water velocity varies from a maximum to a minimum. With the water velocity at a minimum the switch is connected in position 1 so that the greatest number of pulses can be read into the counters. With the water velocity at a maximum and the time of travel of one of the pulses being the greatest, the number of counts read into the counters may be reduced by moving the adjustable switch to position 3. This operation insures that the counters A and B will not overflow when the water velocity is at a maximum.

A mechanical linkage is provided between the 3-position adjustable switch associated with delay multivibrator 140 and the 3-position adjustable switch connected to the inputs of the first three stages of the programmer 42. This linkage enables increased capacitance to be switched into the delay multivibrator circuit 140 as the count read into counters A and B is increased. This action enables the pulse width at the output of 141 to remain substantially constant as the position of the adjustable switches is changed.

A ground connection and an associated switch therefor is provided with counter 51 to enable the counter to be changed from alternating between 0 and 1 states at its two output terminals to continuously exhibiting a 1 state at both output terminals. This connection is provided since it is desirable to have gates 44 and 72 alternating in conduction with gate 172 if bubbles are present between opposing transducers and gates 44, 72 and 172 simultaneously conducting when no bubbles or other disturbances appear between the transducers. The simultaneous conduction of gates 44, 72 and 172 causes two pulses to be produced at one transducer before the first one of the transmitted pulses is received at the other transducer. However, with the ground switch associated with the counter 51 in the open position two pulses from one transducer are never in the water at the same time.

It should be understood that many modifications may be made in the electronic component arrangement of the present invention without departing from the spirit and scope thereof. Accordingly, the invention is limited only by the appended claims.

I claim:

1. A system for measuring two components of water flow velocity at a point between two pairs of spatially separated electro-acoustic transducers comprising:
   a pair of signal channels, each for processing respectively information representing one of said two components of water flow velocity,
   a pair of spatially separated electro-acoustic transducers in each signal processing channel and aligned with the velocity component to be measured,
   a pulse transmitting means selectively coupled to each transducer in each of said signal processing channels for simultaneously pulsing said transducers therein,
   signal receiving means selectively coupled to each transducer in each of said signal processing channels for receiving the signals transmitted by the opposite transducer in each transducer pair,
   switching means for disconnecting said transducers from said pulse transmitting means and connecting said transducers to the input of said signal receiving means,
   means connected to the outputs of said signal receiving means in each of said signal processing channels for determining the time interval between instantaneous pulse reception at each one of said pair of transducers in the signal processing channels, and
   means coupled to said time interval determining means for measuring the direction and velocity of water flow between said pairs of transducers.

2. The system of claim 1 which further includes means coupled to said time interval determining means and to said signal processing channels for compensating for the variations of sound velocity in water in the area where water velocity is to be measured whereby the water velocity measurements between said pairs of transducers can be made independent of the variations of the sound velocity in water.

3. The system of claim 2 which further includes means coupled to said time interval determining means for resolving the output thereof into a digital quantity and conversion means coupled to the output of said resolving means for changing said digital quantity into an analog quantity.

4. A system for determining the direction and velocity of water flow between separate pairs of electro-acoustic transducers comprising a pair of signal processing channels each having a pair of electro-acoustic transducers connected therein, pulse transmitting means coupled to said pairs of transducers in each channel for simultaneously pulsing said transducers, signal receiving means in each signal processing channel, switching means connected between said pulse transmitting means and said receiving means for alternately connecting said pairs of transducers to said pulse transmitting means and said signal receiving means whereby the alternate connection to said pairs of transducers to said receiving means and said pulse transmitting means enables the pulses transmitted by one transducer in each pair to be received by the other transducer and processed in said signal receiving means, variable frequency oscillator means, storage means coupled to the output of each signal processing channel for storing signals from said variable frequency oscillator means therein during an enabled period determined by the instantaneous arrival times of pulses received at the separate transducers in each transducer pair in each signal processing channel, programmer means controlled by said variable frequency oscillator means and coupled to said pulse transmitting means for controlling the time of pulse transmission for each programmer cycle, said programmer means further coupled to said storage means for supplying said signals from said variable frequency oscillator means thereto, and means comparing the occurrence of an internally generated timing pulse in said programmer means and the first received signal at any transducer in said signal processing channels for varying the frequency of said variable frequency oscillator means to synchronize said timing pulse and said first received signal whereby the number of pulses fed into said storage means during each time said storage means are enabled during a programmer cycle are independent of the variations of sound velocity in water in the area where water velocity and direction is to be measured.

5. The system of claim 4 which further includes means coupled to said storage means for resolving the output thereof into a digital quantity and conversion means coupled to said resolving means for converting said digital quantity into an analog quantity.

6. The system of claim 5 which further includes means coupled to said programmer means and to said conversion means for sampling said analog output a fixed time during each pulse transmit cycle at said transducers, said sampling time being independent of variations in the frequency of the variable frequency oscillator means.

7. The system of claim 6 wherein said programmer means is connected to one of said storage means coupled to the output of each signal processing channel for applying a predetermined number of pulses thereto during a first time interval in said programmer cycle and means connecting said programmer means to the other of said storage means coupled to the output of each signal processing channel for applying a predetermined number of pulses thereto during a second interval in said programmer cycle.

8. The system of claim 7 wherein said resolving means includes a pair of registers, each being comprised of a serial binary counter, said counters having their inputs connected to receive the outputs respectively of said storage means in each of said signal processing channels, said resolving means further including an up-down counter connected to each of said registers and enabled to count up or down in accordance with the counts stored in the registers, means connecting the number stored in the up-down counter to a plurality of inputs of said conversion means and means connecting the complement of the number stored in the up-down counter to said registers; said resolver counters and registers having a capacity twice the sum of the combined capacities of said storage means.

9. The system of claim 8 wherein said conversion means includes a series of switches connectable either to a negative or positive voltage onto appropriate locations on a resistive summing line, said switch nearest the output of said resistive summing line being the most significant bit of said conversion means and having twice the effect on the output voltage of said conversion means as the next switch from the output of said summing line, said switches being connected in pairs from said resistive summing line to said positive and negative voltage buses; each succeeding less significant pair of switches decreasing in powers of two through the switch furtherest from the output of said conversion means and means connecting the outputs of successive stages of said up-down counter to successive pairs of switches in said conversion means.

References Cited
UNITED STATES PATENTS

| | | | |
|---|---|---|---|
| 2,991,650 | 7/1961 | Katzenstein et al. | |
| 3,008,332 | 11/1961 | Charbonnier | 73—290 X |
| 3,050,997 | 8/1962 | Lake | 73—194 |
| 3,212,338 | 10/1965 | O'Maley | 73—290 X |

JAMES J. GILL, *Acting Primary Examiner.*

RICHARD C. QUEISSER, *Examiner.*

C. A. RUEHL, *Assistant Examiner.*